United States Patent [19]

Karren et al.

[11] Patent Number: 6,115,039
[45] Date of Patent: *Sep. 5, 2000

[54] PROCESSES AND APPARATUSES FOR CREATING NON-NATIVE DISPLAYS ON A COMPUTER

[75] Inventors: Phillip Earl Karren, Provo; Vinod Kumar Dashora, American Fork; Bryan Keith Walton, Lindon, all of Utah; Ramprasad Siva Golla, San Jose, Calif.; Paul F. MacKay, Provo; Allen Clay Tietjen, Springville, both of Utah

[73] Assignee: Novell, Inc., Provo, Utah

[*] Notice: This patent issued on a continued prosecution application filed under 37 CFR 1.53(d), and is subject to the twenty year patent term provisions of 35 U.S.C. 154(a)(2).

[21] Appl. No.: 08/819,578

[22] Filed: Mar. 14, 1997

Related U.S. Application Data

[60] Provisional application No. 60/013,490, Mar. 15, 1996.
[51] Int. Cl.[7] .................................................. G06F 3/14
[52] U.S. Cl. ........................... 345/335; 345/340; 345/346
[58] Field of Search ..................................... 345/333, 335, 345/340, 339, 356, 346

[56] References Cited

U.S. PATENT DOCUMENTS 5,581,686 12/1996 Koppolu et al. ..................... 345/340
5,625,783 4/1997 Ezekiel et al. ...................... 345/352
5,634,019 5/1997 Koppolu et al. ..................... 345/335

FOREIGN PATENT DOCUMENTS

566895 A2 10/1993 European Pat. Off. ...... G06F 15/403

OTHER PUBLICATIONS

Neuron Data Launches Element Environment 2.0—Interoperable Objects for Internet & Enterprise Computing, Business Wire, Feb. 27, 1996.

SQR Family Extended to the Internet; MITI Announces Upgrade to SQR Server and SQR Workbench Production Reporting System Business Wire, Nov. 4, 1996.

*Primary Examiner*—Raymond J. Bayerl
*Assistant Examiner*—Chadwick A. Jackson
*Attorney, Agent, or Firm*—Dinsmore & Shohl LLP

[57] ABSTRACT

A method and apparatus for creating a non-native display is disclosed. A display application is loaded having a plurality of native window classes, a window frame, and a display bar located within the window frame. One of the native window classes is associated with a non-native window class by passing a value from a non-native file to the display application. A composite child window is created having a non-native display configuration. The composite child window is located within the window frame of the display application. The process of creating the composite child window involves the steps of creating an instance of the associated native window class, and creating an instance of the non-native window class. The display bar owned by the display application is controlled using the composite child window.

17 Claims, 8 Drawing Sheets

PROCESSES AND APPARATUSES FOR CREATING NON-NATIVE DISPLAYS ON A COMPUTER

This application claims the benefit of U.S. Provisional Application Ser. No. 60/013,490, filed Mar. 15, 1996, which is also hereby fully incorporated by reference herein.

TECHNICAL FIELD OF THE INVENTION

This invention relates generally to the field of processes and apparatuses for creating a display on a computer, and, more particularly, to processes and apparatuses for creating a composite window having a non-native display configuration on a computer.

BACKGROUND OF THE INVENTION

The development of software for graphical user interfaces (GUI) has traditionally been a complex and time consuming process. Developers have to write extensive source code, often using cryptic software languages having little resemblance to English in order to provide a graphical interface which is responsive to a user's needs. However, it is often not possible to predict all the needs of the user and provide native graphical display capabilities in a computer program which permits the user of the program to access all the information desired in a manner most suited to the user's needs. Further, it is often times not possible to provide all the functionality which a user could conceivably require in a graphical user interface of a display application. For example, a network administrator who is responsible for administering the large volume of information associated with a computer network often needs flexible graphic displays to facilitate the effective and efficient management of this network. Network software providers have attempted to fill this need by providing graphical display management applications for accessing the information associated with the network such that the network administrator can view and modify this information as appropriate. However, often times the network administrator is in need of displaying information and accessing unique functions which are not supported by the network management application but which are necessary for the administration of the network.

Software Development Kits (SDKs) can be provided which permit the network administrator to customize, in a limited way, the graphic display of the network management application so that information and functionalities unsupported by the network management application can be viewed and modified. Using SDKs, for instance, the network administrator can add a new dialog window with corresponding functionality to process its messages. Even in these cases however, the network administrator is limited to displaying the information according to the display configurations defined by the network management application which owns the display. As such, there is a need to provide processes and apparatuses which are capable of creating non-native displays for use with a display application, such as a network management application, which can be configured by a third party as desired while still retaining the functionality supplied by the native or host display application.

SUMMARY OF THE INVENTION

One aspect of the present invention is a process in a computer system for creating a non-native display. A display application is loaded having a plurality of native window classes, a window frame, and a display bar located within the window frame. One of the native window classes is associated with a non-native window class by passing a value from a non-native file to the display application. A composite child window is created having a non-native display configuration. The composite child window is located within the window frame of the display application. The process of creating the composite child window involves the steps of creating an instance of the associated native window class, and creating an instance of the non-native window class. The display bar owned by the display application is controlled using the composite child window.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

DETAILED DESCRIPTION OF THE PREFERRED EMBODIMENTS

Reference will now be made in detail to the present preferred embodiments of the invention, examples of which are illustrated in the accompanying drawings wherein like numerals indicate the same elements throughout the views. As will be understood, the present invention, in its most preferred form, relates to processes and apparatuses for creating a composite window comprising a non-native Multiple Document Interface (MDI) child window and a child window on a computer having a display application disposed thereon, the display application being capable of implementing both native and non-native child windows. Processes and apparatuses incorporating the present invention can advantageously provide a seamless graphical user interface combining native and non-native display configurations, where a composite child window incorporating non-native display configurations can modify the functionality (e.g., menu bar, status bar, tool bar, etc.) of the display application. As used herein the phrase "non-native" is intended to refer to an entity (e.g., MDI child window, tool bar item, etc.) which is created or defined, for the most part, by a set of instructions which are not part of the display application of the computer. In contrast, the word "native" is intended to refer herein to an entity which is created or defined, for the most part, by a set of instructions which are part of the display application of the computer. The composite child windows of the present invention can be flexibly configured to display, for example, predetermined information relating to computer network entities, a network entity being any physical or logical entity associated with a computer network, in the manner most convenient for the user of the computer. Physical network entities can include a network server, a network client, or a computer file. Logical network entities can include a computer user or a group of users, countries, companies, organizations, departments, buildings, and the like.

This flexible display capability can be especially useful where these entities are represented as objects in an extensible network directory service, but where a network management application does not support the ability to flexibly control the display of information associated with these extended objects. In such a case, the manner of displaying the information associated these extended objects through non-native displays provides improved flexibility for a network administrator in the task of managing a computer network. In addition to creating the composite child window the present invention can also modify or otherwise control the configuration and functionality of the display bars (e.g., tool bar, status bar, menu bar, etc.) of the display application.

Figure 1:
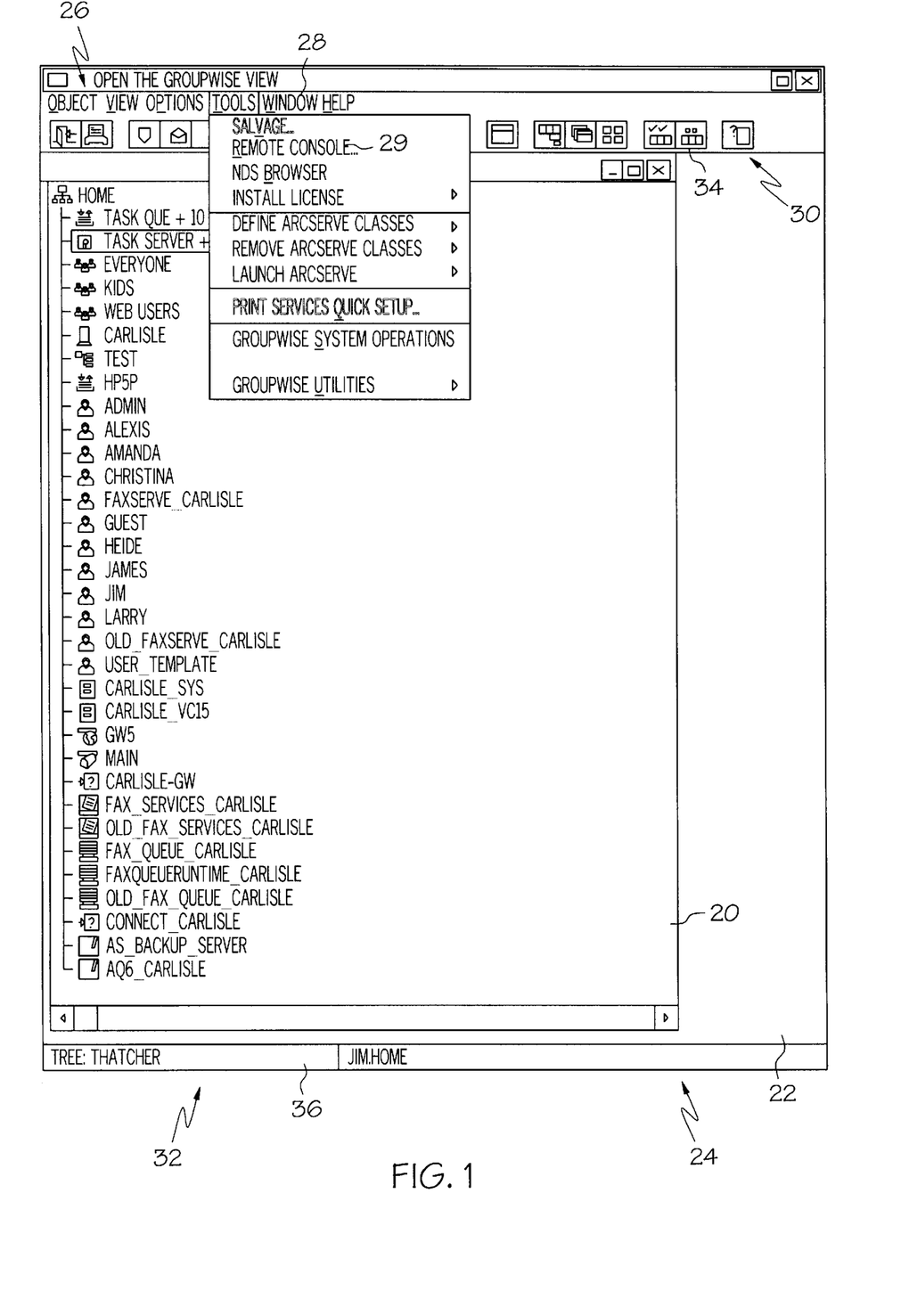
FIG. 1 is a graphical illustration of an MDI window display.

As used herein the phrase "MDI child window" is intended to refer to an MDI child window 20 of an MDI client window 22 of an MDI frame window 24, as generically illustrated in FIG. 1, these windows being created in the Microsoft Windows® operating environment. There is typically only one MDI frame window 24 for any one application with this window serving as the application's main window and displaying a menu bar 26 having at least one menu 28. Each menu 28 can be provided with at least one menu item 29 thereunder, as is known in the art. The MDI frame window 24 also preferably has a tool bar 30 and a status bar 32, the tool bar 30 having at least one tool bar item 34 and the status bar 32 having at least one status bar item 36.

The MDI client window 22 is owned by the MDI frame window 24 and handles operations that apply generally to the application. Each MDI child window displays information and is a child of the client window 22 and can respond to menu commands and other events (e.g., mouse clicks, keyboard operations and the like). While it cannot have its own menus within its window, an MDI child window can be controlled by the menu bar 26 of the frame window 24. Each window (e.g., the frame window 24, the MDI client window 22, and the MDI child window 20) has a handle associated therewith which is used by the Windows operating environment to ascertain what entity should respond to messages from a window (e.g., mouse clicks, etc.). While the present invention is described herein with respect to the Microsoft Windows® operating environment and MDI window generation in particular, it is contemplated that the present invention can be adapted to accommodate other window-type displays which are similar to MDI windows. As used herein, the phrase "child window" is intended to generically refer to any window which is a child of another window.

Figure 2:
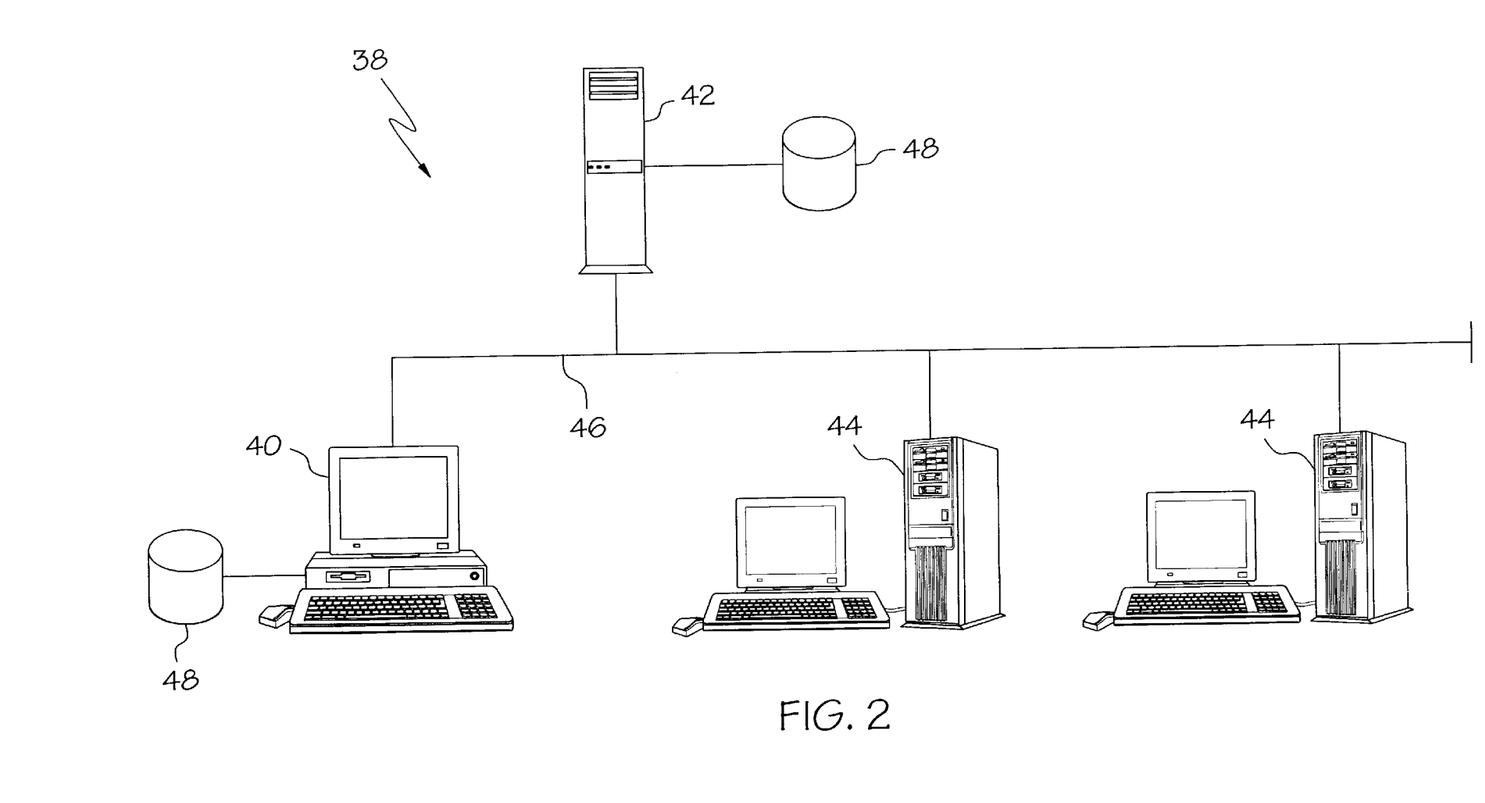
FIG. 2 is a schematic illustration of a computer network suitable for use with the present invention.

One of the many computer systems suitable for use with the present invention is illustrated as a computer network 38 in FIG. 2, the computer network 38 being illustrated in the form of a client/server type network. In a client/server architecture, the portions of an application that interact with users or access network resources are called client applications or client software, and the portions of an application that process requests and information are called server applications or server software. Client computers tend to run client software and server computers tend to run server software, however a server can be a client as well. As one with ordinary skill in the art will readily appreciate, a client/server network is only one type of network, and a variety of other configurations, such as peer-to-peer connections, are also considered computer networks which can be adapted to use the present invention.

A client computer is illustrated in FIG. 2 in the form of a display computer 40 while a server computer is illustrated in the form of a file server computer 42. The file server computer 42 is a central repository of files and programs while the display computer 40 preferably executes a display application suitable for accessing information associated with the computer network 38. The display computer 40 can also be provided in the form of any conventional or special-purpose computer, such as a desktop computer, a tower computer, a micro-computer, a mini-computer, and a mainframe computer. These other computer forms are generically represented by computers 44 in FIG. 2 of the computer network 38. The computers of the computer system 38 are interconnected by the network signal lines 46 which can be provided in the form of twisted pair, coaxial, optical fiber cables, telephone lines, satellites, microwave relays, and other data transmission means known to those of skill in the art.

The display computer 40 and the file server computer 42 each preferably comprise a storage medium 48, which can be provided in the form of a floppy drive, a tape drive, an optical drive, or any other magnetic, optical, or computer-readable storage device having a specific physical substrate configuration. The substrate configuration represents data and instructions which cause the computer to which it is connected to operate in a specific and predefined manner as described herein. Thus, the storage medium 48 tangibly embodies a program, functions, and/or instructions that are executable by at least the display computer 40 and/or the file server computer 42 to perform the steps for generating a non-native display configuration on the display computer 40 in accordance with the present invention. Other examples of an appropriate storage medium 48 can include a hard disk, a CD-ROM, PROM, RAM and the like. Those of skill in the art will appreciate that the present invention will work with a variety of other networks and computers, although particular individual devices and computer systems are described for ease of discussion.

Figure 3:
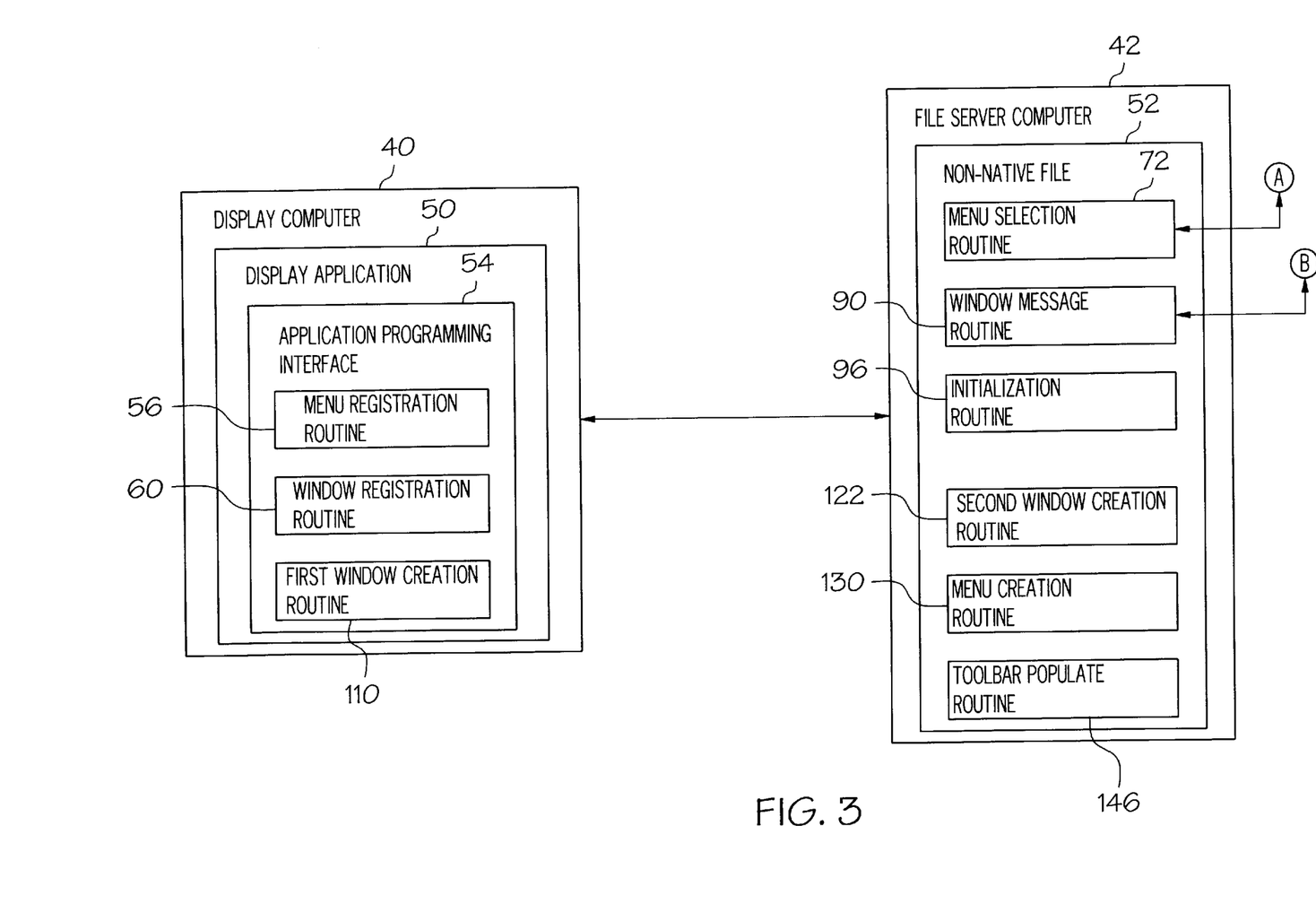
FIG. 3 is a schematic representation of a preferred computer system made in accordance with the present invention.

Referring to FIG. 3, the preferred computer network 3 8 of the present invention will now be described in greater detail. The display computer 40 preferably comprises a display application 50 having a set of instructions for accessing information associated with network entities such that this information can be displayed and/or modified by the user of the display computer 40. While the present invention is described herein with respect to the display application 50, it is contemplated that the present invention can be adapted to accommodate other display applications, such as NOVELL's ManageWise and the like. Preferably, the display application 50 is provided in the form of NOVELL's NETWARE ADMINISTRATOR which is an executable computer file (e.g., nwadmin.exe) typically stored on the file server computer 42 and loaded onto the display computer 40 when prompted by the user of the display computer 40. More specifically, NETWARE ADMINISTRATOR is a Windows-based utility that provides a graphic user interface for viewing and/or modifying information associated with a variety of network entities.

In accordance with one aspect of the present invention, the file server computer 42 preferably has a non-native file 52 disposed on its storage medium 48. As discussed more fully hereafter, the non-native file 52 preferably contains instructions for implementing, in part, the display of a composite child window having a non-native display configuration on the display computer 40. The non-native file 52 is preferably provided in the form of a Dynamic Link Library (DLL) which provides the resources (e.g., bitmaps, etc.) and routines for implementing the non-native displays previously described. A generic description of the structure and functionality of DLLs which can interface with NOVELL's NETWARE ADMINISTATOR is provided in the Net Ware Library Reference for C: Client Functions, published by NOVELL, Inc. of Provo, Utah, the substance of which is fully incorporated herein by reference. While the computer network 38 is discussed by way of example herein as having the non-native file 52 disposed on the storage medium 48 of the file server computer 42, it is contemplated that other arrangements can be implemented, such as where the non-native file 52 is disposed on the storage medium 48 of the display computer 40 instead of the file server computer 42.

Figure 4:
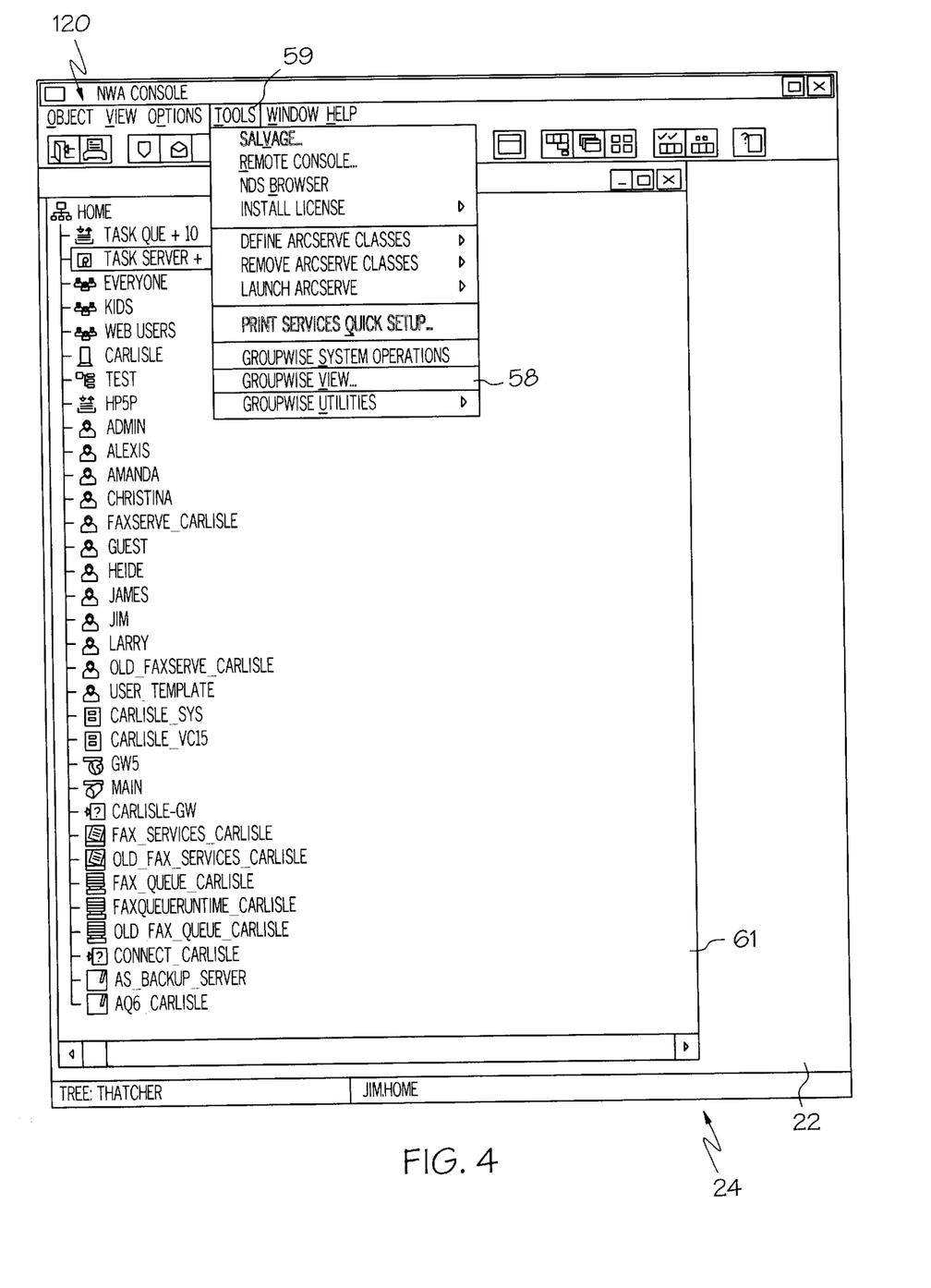
FIG. 4 is a graphical illustration of a preferred native window display using the computer system of FIG. 3.

Referring to FIGS. 3 and 4, the display application 50 disposed on the display computer 40 preferably comprises an application programming interface 54 for interfacing or otherwise communicating with the non-native file 52. More preferably, the application programming interface 54 comprises a menu registration routine 56 for facilitating the display of a non-native menu item 58 under a native menu 59 when the native window 61 is active. The application programming interface also comprises a window registration routine 60 for facilitating the display of a composite child window 62 (FIG. 6) on the display computer 40, this composite child window 62 being created in response to a user selecting the non-native menu item 58, illustrated in FIG. 4, on the display computer 40. While both of these registration routines reside within the display application 50, they are both called by the non-native file 52 which passes in the values for the arguments of these routines, these values having been defined by the party who generates the non-native file 52.

Figure 5:
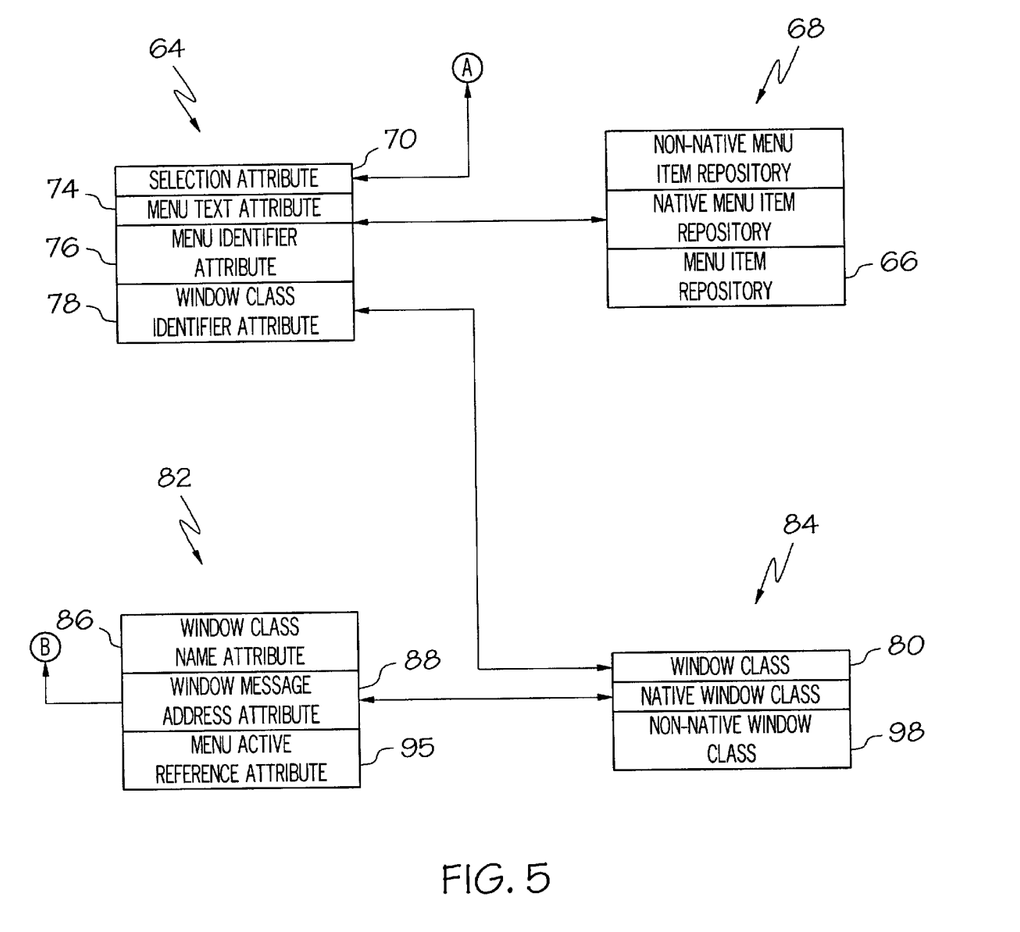
FIG. 5 is a schematic representation of preferred data constructs of the present invention which are suitable for use with the computer system of FIG. 3.

As illustrated in FIG. 5, each menu item is are defined by a set of menu attributes 64 with this set being associated with a menu item repository 66 (such as a data structure). The menu item repositories 66 form a menu repository list 68, which can be provided in the form of a linked list or another data structure, such that the menu item repositories 66 and their associated sets of menu attributes 64 can be stored and accessed by the display application 50. The set of menu attributes 64 preferably comprises a selection attribute 70 for storing a reference, such as a pointer, to a menu selection routine 72 which is called when the menu item associated with this attribute is selected, a menu text attribute 74 for storing a string of characters describing the menu item which will be displayed on the display computer 40, a menu identifier attribute 76 for storing an integer or other identifier which is generated by the display application 50 to uniquely identify this menu item, and a window class identifier attribute 78 for storing a reference to a window class 80 under whose instances this menu item can appear. For example with respect to FIG. 4 where the display application is NOVELL's NETWARE ADMINISTATOR, the values for the menu attribute set 64 associated with the non-native menu item 58 might be as follows:

Selection Attribute=SelectionViewActionProc
Menu Text Identifier="Groupwise View"
Menu Identifier Attribute=&menuID
Window Class Identifier Attribute=NWA_Console As used herein, the phrase "window class" is intended to refer generally to template having attributes which store information (either native or non-native) on the display computer 40. More preferably, a window class refers to a Windows® construct which is in the form of a typedefstruct, as is known in the art. Thus, a window class contains information that determines how a window looks and behaves. Windows which are created using the window information of a particular window class is considered herein as instances of this window class.

While the set of menu attributes 64 has been described herein as comprising four attributes, it is contemplated that this set can be adapted to incorporate additional attributes if desired. For example, a help text can be added for storing a string of characters which will be displayed adjacent the non-native menu item 58 on the display computer 40 when a screen cursor is placed adjacent the non-native menu item 58. In another embodiment, an additional attribute can be added which could either pass a value or trigger a callback function located in the non-native file 52 to validate the non-native menu item 58 to be displayed under the native menu 59. If the non-native menu item is validated, it will be displayed as previously described and can be selected by a user of the display computer 40. If it is not validated, it is displayed but cannot be selected by a user.

Preferably, each window class 80 is defined by a set of window attributes 82, the window classes 80 forming a window class list 84 which can be provided in the form of a linked list or another data structure. The window class list 84 can be stored and accessed by the display application 50 in a similar manner as the menu repository list 68 to facilitate the creation of windows and menus associated with these lists. Preferably, the set of window attributes 82 comprises a window class name attribute 86 for storing a string of characters describing the name of a window class, a message address attribute 88 for storing a reference to an address for the window message routine 90 (e.g., a window procedure that processes messages for the instances of the class), and a menu active reference attribute 95 for storing a reference to a menu associated with instances of this window class. As described more fully hereafter, the non-native file 52 of the present invention passes values for these window attributes to the display application 50 which are registered with the display application 50, thereby defining a native window class. Because the display application contains the necessary instructions for creating an instance of this window class, this window class would be considered a native window class. In contrast, a window class whose instructions for creating an instance of this window class are located in the non-native file 52 would be considered a non-native window class.

Figure 6:
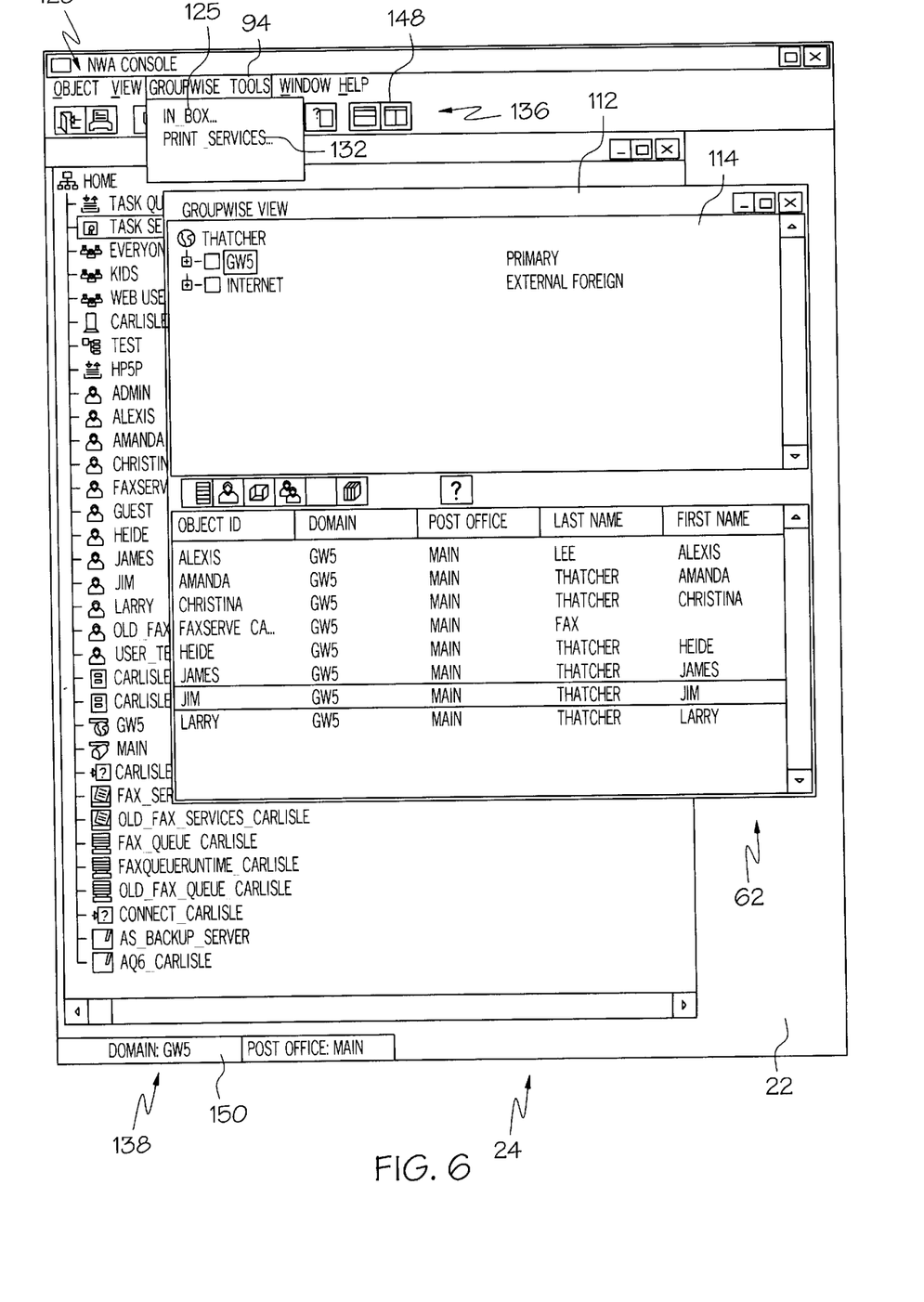
FIG. 6 is a graphical illustration of another preferred composite child window display using the computer system of FIG. 3.

As illustrated in FIG. 3, the non-native file 52 preferably also comprises an initialization routine 96 which is called by the display application 50 when the display application 50 is loaded on the display computer 40 and a second window creation routine 122 which executes a set of instructions for displaying, in part, the composite child window 62 of FIG. 6. The initialization routine 96 preferably comprises calls to the menu registration routine 56 and the window registration routine 60, both of which are located in the display application 50, as previously discussed. The calls to these registration routines pass to the display application 50 the necessary values for implementing the creation of instances of a native window class, and, most preferably, for implementing instances of native MDI child window class. More preferably, the calls to the menu registration routine 56 and the window registration routine 60 from the non-native file 52 pass arguments corresponding to the set of menu attributes 64 associated with a non-native menu item repository and the set of window attributes 82 associated with a native window class (i.e., associated with an MDI child window class as discussed hereafter), respectively. These values can then be used by the display application 50 to create the non-native menu item 58 (FIG. 4) when a native window 61 is active. In addition, these values can be used by the display application 50 to create the composite child window 62 (FIG. 6) having a non-native display configuration when the non-native menu item 58 associated with this window is selected. The non-native menu item 58 and the composite child window 62 illustrated herein are exemplary in nature and it is understood that the non-native menu item 58 and the native window 61 can be configured as desired according to the present invention.

In accordance with the above-described preferred embodiment of the present invention, the routines and calls comprising the non-native file 52 can be illustrated generically as follows:

```
menu select routine ( )
window message routine ( )
initialization routine ( )
{
    menu registration routine (selection attribute, menu text attribute,
        menu identifier, window class identifier attribute);
    window registration routine (window class name attribute, window
        message address attribute, menu active reference attribute);
}
second window creation routine ( )
```

While the non-native file 52 has been described herein for purposes of illustration as comprising a single menu registration routine 56 and its associated window registration routine 60, it is contemplated that the non-native file 52 can comprise a plurality of menu and window registration routines for defining a plurality of non-native menu items to be displayed under at least one native menu item and a plurality of non-native window classes. Further, while the present invention has been described herein with respect to separate menu and window registration routines 56 and 60, it is contemplated that these can be combined if so desired.

Figure 7:
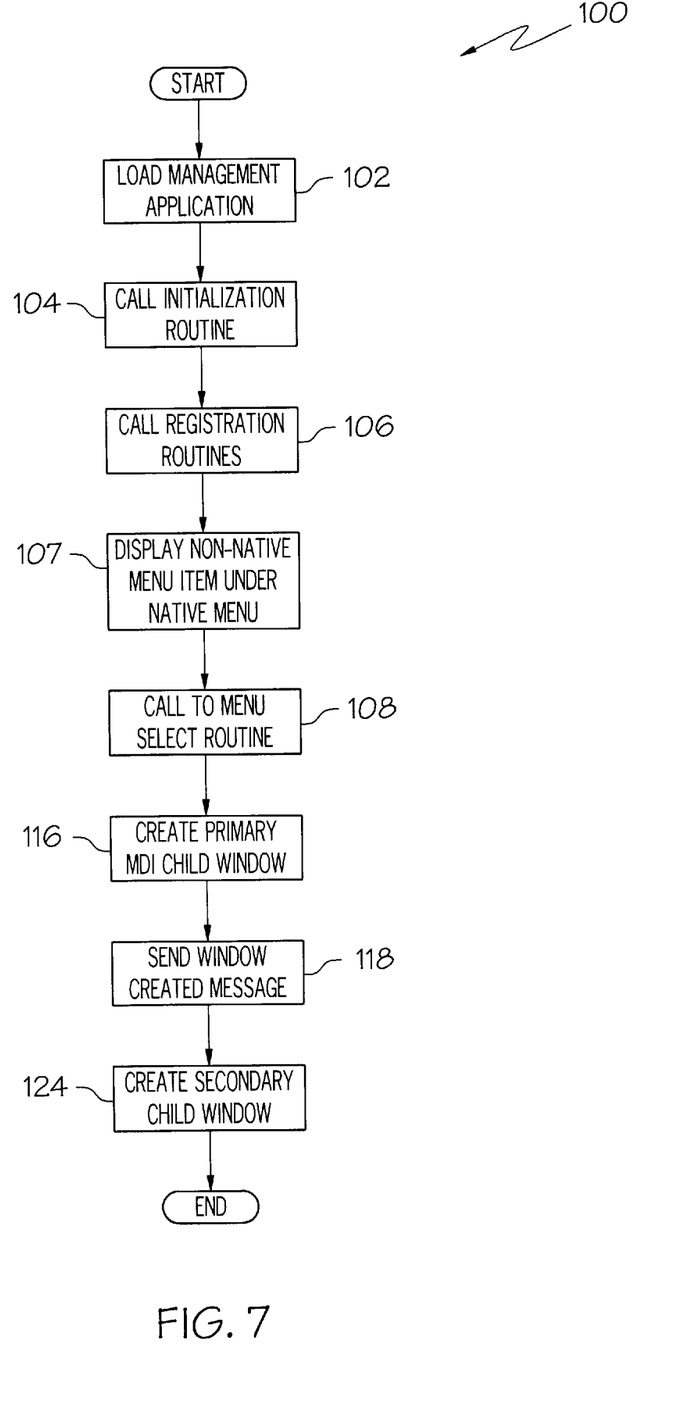
FIG. 7 is a schematic representation of a preferred process for creating the MDI window display of FIG. 6.

Referring now to FIGS. 6 and 7, a preferred process 100 for displaying the exemplary composite child window 62 on the display computer 40 will now be described. Execution begins in block 102 where the display application 50 is loaded on the display computer 40 at the request of the user of the display computer 40. The display application 50 preferably reads an initialization file (e.g., NWADMIN.ini) loaded with it on the display computer 40 and calls the initialization routine 96 of each non-native file 52 listed in the initialization file, as shown in block 104. Execution of the initialization routine 96 calls the menu registration routine 56 and the window registration routine 60 of the display application 50, as illustrated by block 106. In calling these routines, the non-native file 52 will pass values for the arguments of these routines, as previously discussed, which correspond to the set of menu attributes 64 and the set of window attributes 82. Having passed these values to the display application 50, the display application 50 displays the non-native menu item 58 under the native menu 59 when the native menu is selected, as described in block 107, the functionality and characteristics of this non-native menu item being described by its set of menu attributes defined in the non-native file 52.

After displaying the non-native menu item 58 in block 107, the display application 50 calls the menu selection routine 72 of the non-native file 52 based upon the selection reference attribute 70 associated with the non-native menu item 58, as shown in block 108. The menu selection routine 72 is executed to create, in part, the composite child window 62 having a non-native display configuration on the display computer 40. More particularly, the composite child window 62 comprises a primary native MDI child window 112 and a secondary non-native child window 114, each child window 112 and 114 being created by separate routines. Thus the composite child window can be viewed as a union of the primary and secondary child windows, the primary native MDI child window being a parent window of the secondary non-native child window. The primary native MDI child window provides access to the display bars of the frame window 24 while the non-native child window 114 displays the desired non-native display configuration. The menu selection routine 72 preferably calls a first window creation routine 110 which is part of the application programming interface 54 of the display application 50. The first window creation routine 110 creates the primary native MDI child window 112, as shown in block 116 by accessing a set of instructions in the display application 50 which define how the primary native MDI child window is to be created. The call to the first window creation routine 110 preferably passes as arguments the title of the primary native MDI window to be displayed in the title block of this window (e.g., "GroupWise View" as shown with respect to the primary native MDI child window 112 of FIG. 6). In addition to the title of the primary native MDI child window 112 (which also serves as the title for the composite child window 62), the menu selection routine also passes in the call to the first window creation routine 110 the value for the window class name 86 associated with the instance of the native MDI child window to be created by the first window creation routine 110. The value of this window class name 86 is the same as the value of the window class name 86 passed as an argument of the call to the window registration routine 60 in block 106. In this manner, the instance of the window class to be created (i.e., the primary native MDI child window 112) is identified and the appropriate window message routine 90 for processing the messages from this window is also identified for the display application 50. As described more fully hereafter, the non-native menu 94 (FIG. 6) associated with the primary native MDI child window is displayed in a menu bar 120 of the frame window 24 owned by the display application 50, this non-native menu being associated with the menu active reference attribute 95 of the non-native window class 98 of which the primary native MDI child window 62 is an instance.

After creating the primary native MDI window 112, a window created message is sent to the window message routine 90 of the non-native file 52, as shown in block 118.

The window message routine 90 sorts incoming messages from the display application 50 and executes the appropriate response for each message. In response to the window created message of block 118, the window message routine 90 preferably calls a second window creation routine 122 of the non-native file 52 to create the secondary non-native child window 114, as shown in block 124, using the handle of the primary native MDI child window 112 which was generated by the display application 50 at the creation of the primary native MDI child window 112. This identifies the secondary non-native child window as a child of the primary native MDI child window 112. Execution of the second window creation routine 124 in block 124 by the non-native file 52 creates a second handle which is owned by the non-native file 52 (as opposed to the handle of the primary native MDI child window which is owned by the display application 50 which generated it). This separation in the ownership of the handles between the primary and secondary child windows allows the non-native file 52 to control the display configuration of the secondary non-native child window 114 independent of the display application 50 while the primary native MDI child window, which is a child window of the client window 22 of the display application 50, can control the display bars (e.g., menu bar, tool bar, status) of the display application 50. To a user of the display computer 50, this process appears as seamless integration which provides the capability of displaying non-native display configurations while at the same time providing access to the display bars (and hence their functionality) of the display application 50. As a consequence, non-native menus can be displayed in the menu bar 120. In addition, this arrangement shields the display application 50 from outside parties while still allowing this outside party to create a non-native display configuration on the display computer 50. Further a consistent look and feel is provided by the display application 50 to its users despite the fact that a multitude of non-native display configurations can be incorporated because creation of the primary native MDI child window remains under the control of the display application 50.

The second window creation routine 122 which creates the secondary non-native child window can be defined to display a variety of information within the secondary non-native child window 114 independent of the display application 50. For example, the secondary non-native child window 114 can be adapted to display a variety of network information (i.e., information relating to various network entities) as well as the relationship among and between this information. FIG. 6 illustrates an exemplary implementation where information relating to e-mail messaging and communications is displayed, this information being retrieved and displayed independent of the display application 50 while still providing access to the menu bar 120 of the display application 50, as illustrated by the insertion of the non-native menu 94 in the menu bar. In addition, the secondary non-native child window 114 controls its display of such items as the type and location of a scroll bar, icons, text, as well as the background color of this child window.

While the present invention has been described with respect to creating a composite child window 62 at the prompting of the user of the display computer 40, additional embodiments are contemplated where the composite window generation is initiated automatically. For example, the display application 50 or the non-native file 52 can be provided with a set of instructions for saving the configuration of the frame window 24 and all its child windows (both native and non-native) thereunder when the frame window 24 is closed. When the display application 50 is next loaded by the user of the display computer 40, a restore routine can restore the frame window configuration, including all its native and non-native child windows, as it existed just prior to the previous termination of the display application 50. Particularly, the display application 50 can be adapted to automatically generate the primary native MDI child windows and send a message to the window message routine 90 of the non-native file 52 which triggers creation of the appropriate secondary non-native child windows.

Figure 8:
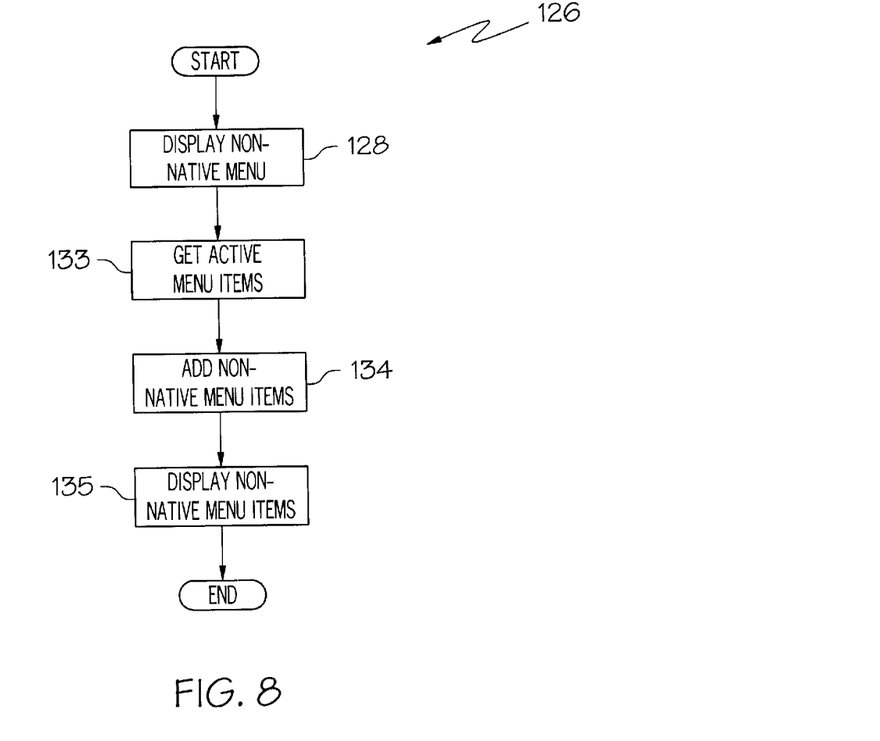
FIG. 8 is a schematic representation of another preferred process for displaying non-native menu items in a menu bar.

In addition to creating non-native MDI child windows on the display computer 40, the processes and apparatuses of the present invention can also be adapted to provide a non-native menu 94 and/or a non-native child menu item 125 in the menu bar 120 of the frame window 24 owned by the display application 50, these non-native menus and menu items becoming active when the composite child window 62 is created or when it becomes active from the background (as opposed to the non-native menu item 58 which is displayed before the composite child window 62 is created). Referring to FIG. 8, a preferred process 126 for creating the exemplary non-native menu 94 will now be described. Execution begins in block 128 where a menu creation routine 130 of the non-native file 52 is executed. This execution can be triggered by a call from the display application 50 or executed as part of a call to another routine. For example, the menu creation routine 130 can be executed as part of blocks 116 and/or 118 of FIG. 7, wherein the window creation routines are executed, or, alternatively as part of the restore routine if that functionality is provided. So that composite child windows which are distinct from composite child window which is active on the display application 50 can be created, other non-native menu items 132 associated with these other composite child windows should preferably be displayed under the active non-native menu 94 (along with any non-native child menu items 125).

To accomplish this, the menu creation routine 130 preferably obtains from the display application 50 the menu items which are active in the native menu 59 under which the non-native menu items 58 appear when the native MDI child window 61 is displayed, as shown in block 133. In block 134, the menu creation routine 130 adds to the list of active menu items the non-native child menu items 125 to be displayed in the non-native menu 94 such that a union of all menu items (native and non-native) which are to be displayed is generated. This union of menu items is then associated with the non-native menu 94 so that they can be displayed and selected when the non-native menu 94 associated with the composite child window 62 associated therewith is selected, as shown in block 135. While it is contemplated that the step of block 134 can be implemented in a variety of ways, an array storing the value of each menu item identification member associated with the menu item to be displayed is preferred. In this manner, the display computer 40 can always display each of the non-native child menu items 125 associated with each of the non-native windows classes regardless of which window is active.

Figure 9:
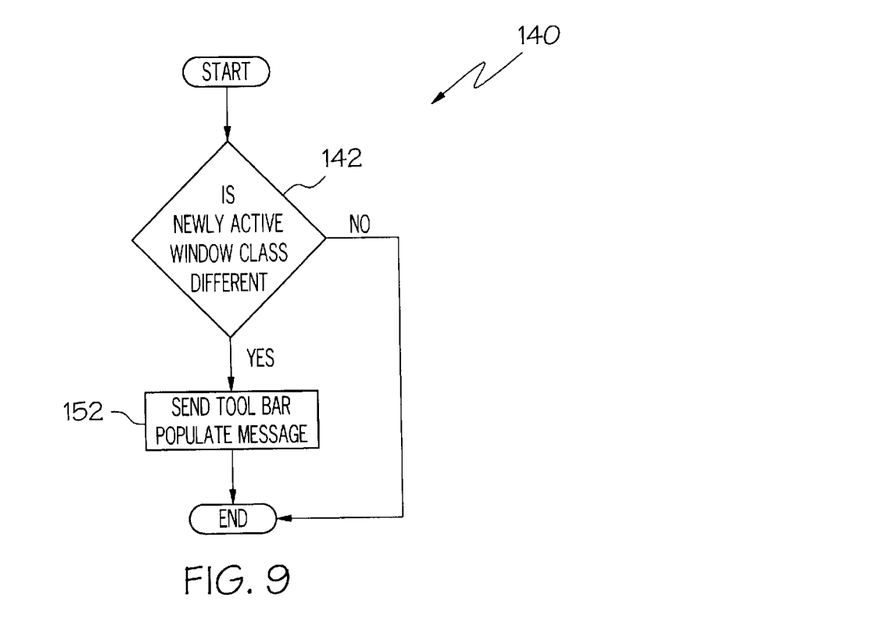
FIG. 9 is a schematic representation of a preferred process for displaying a tool bar having non-native tool bar items.

In addition to displaying a non-native menu 94 and/or a non-native child menu item 125, the apparatuses and processes of the present invention can also provide a tool bar 136 having non-native tool bar items as well as a status bar having non-native status bar items on the frame window 24 owned by the display application 50 when the composite child window 62 is created or becomes active. This process is represented as 140 in FIG. 9. Particularly, when the composite child window 62 is created or becomes active (e.g., blocks 116 and 118 of FIG. 7), block 142 is executed, wherein it is determined if the newly active window is an instance of a class which is different from the window class of the previously active window. If it is not, the tool bar of the frame window 24 does not have to modified. If it is, the display application 50 sends a message to the non-native file 52 to trigger execution of a tool bar populate routine 146 which sends the information associated with each non-native tool bar item 148 defined in the non-native file 52 so that each non-native tool bar item 148 associated with the newly active window can be placed in the tool bar 136 (FIG. 6) of the frame window 24 owned by the display application. For example, the type of information supplied by the non-native file 52 to the display application 50 can include that information necessary to display the proper tool bar item button types, bitmaps for the button display, and the like. As will be understood by one skilled in the art, the above described process 140 can also be adapted to display a non-native status bar item 150 in the status bar 138 owned by the display application 50 when the composite child window 62 is created or becomes active.

Having shown and described the preferred embodiments of the present invention, further adaptation of the methods and apparatuses for creating non-native displays on a computer can be accomplished by appropriate modifications by one of ordinary skill in the art without departing from the scope of the present invention. A number of alternatives and modifications have been described herein and others will be apparent to those skilled in the art. For example, the display computer 40 can be adapted to provide the capability for a user of the display computer 40 to customize the tool bar with native and non-native tool bar items such that the user can effectively combine and/or alter the native tool bar as desired. This could implemented by way of a customization window which can be initiated from the menu bar of the frame window 24, wherein the user can select tool bar items (native and non- native) which are stored in an array and displayed by way of the tool bar populate routine 146 when a composite child window is created or becomes active. Accordingly, the scope of the present invention should be considered in terms of the following claims and is understood not to be limited to the details of the structures and methods shown and described in the specification and drawings.

What is claimed is:

1. A process in a computer system for creating a non-native display, comprising the steps of:
   (a) loading a display application on a computer which is capable of accessing attribute information about a computer network, said display application having a plurality of native window classes, a window frame, and a display bar located within the window frame;
   (b) associating one of said native window classes with a non-native window class by passing a value from a non-native file to said display application;
   (c) creating a composite child window having a non-native display configuration, said non-native display configuration adapted to display said attribute information about said computer network, said composite child window being located within the window frame of the display application, said step of creating involving the steps of:
      i. creating an instance of said associated native window class, and
      ii. creating an instance of said non- native window class; and
   (d) configuring said display bar owned by said display application using said non-native file.

2. A computer readable medium, comprising software capable of performing the method of claim 1.

3. The process of claim 1, further comprising the step of creating a plurality of composite child windows on the display computer.

4. The process of claim 1, wherein said display bar is a tool bar further comprising the step of displaying a non-native tool bar item in said tool bar.

5. The process of claim 1, wherein said display bar is a status bar further comprising the step of displaying a a non-native status bar item in said status bar.

6. The process of claim 1, further comprising the step of saving said non-native display configuration and wherein said step of creating said composite window occurs when said display application is loaded.

7. The process of claim 1, wherein the step of creating a composite child window having a non-native display configuration occurs after displaying said non-native menu item.

8. The process of claim 1, further comprising the step of storing the attribute information about the computer network in a network directory service.

9. The process of claim 1, wherein said display bar is a menu bar, further comprising the step of displaying a non-native menu in said menu bar.

10. The process of claim 9, further comprising the steps of selecting the non-native menu and displaying at least one non-native menu item thereunder which is associated with the non-native window class.

11. The process of claim 10, further comprising the step of displaying a non-native menu item associated with a second non-native window class under the non-native menu.

12. The process of claim 9, further comprising the step of displaying a native menu item associated with a second one of said plurality of native window classes under the non-native menu.

13. A computer system for creating a non-native display, comprising:
   a) a display application having a plurality of native window classes and a window frame, said display application adapted to access attribute information about a computer network;
   b) a non-native file in data communication with the display application, the non-native file storing a value which associates one of the plurality of native window classes with a non-native window class;
   c) a registration routine within the display application for receiving the value from the non-native file;
   d) a native child window within the window frame, said native child window being associated with the associated native window class; and
   e) a non-native child window which is a child of the native child window, the non-native child window displaying a non-native display configuration, the non-native configuration adapted to display the attribute information about the computer network.

14. The computer system of claim 13, wherein the registration routine comprises a menu registration routine.

15. The computer system of claim 13, wherein the display application further includes a menu bar having a non-native menu.

16. The computer system of claim 13, wherein the display application further includes a tool bar having a non-native tool bar item.

17. The computer system of claim 13, wherein the display application further includes a status bar having a non-native status bar item.

* * * * *

UNITED STATES PATENT AND TRADEMARK OFFICE
CERTIFICATE OF CORRECTION

PATENT NO. : 6,115,039
DATED : September 5, 2000
INVENTOR(S) : Phillip Earl Karren et al.

It is certified that error appears in the above-indentified patent and that said Letters Patent is hereby corrected as shown below:

Claim 5, column 12, line 2, replace "a a" with --a--.

Signed and Sealed this

Tenth Day of April, 2001

Attest:

NICHOLAS P. GODICI

*Attesting Officer*    *Acting Director of the United States Patent and Trademark Office*